(12) United States Patent
Schertz et al.

(10) Patent No.: US 9,033,080 B2
(45) Date of Patent: May 19, 2015

(54) DEBRIS PASSAGEWAY FOR WORK VEHICLE COOLING PACKAGE

(75) Inventors: Rex Schertz, Hesston, KS (US); Stanley R. Clark, Hesston, KS (US); Mark D. Walton, Hutchinson, KS (US)

(73) Assignee: AGCO Corporation, Duluth, GA (US)

( * ) Notice: Subject to any disclaimer, the term of this patent is extended or adjusted under 35 U.S.C. 154(b) by 573 days.

(21) Appl. No.: 13/437,199

(22) Filed: Apr. 2, 2012
(Under 37 CFR 1.47)

(65) Prior Publication Data
US 2012/0247738 A1 Oct. 4, 2012

Related U.S. Application Data (60) Provisional application No. 61/471,063, filed on Apr. 1, 2011, provisional application No. 61/471,075, filed on Apr. 1, 2011, provisional application No. 61/471,014, filed on Apr. 1, 2011, provisional application No. 61/471,050, filed on Apr. 1, 2011, provisional application No. 61/471,040, filed on Apr. 1, 2011, provisional application No. 61/470,996, filed on Apr. 1, 2011, provisional application No. 61/471,025, filed on Apr. 1, 2011.

(51) Int. Cl.
| | |
|---|---|
| *F28F 19/01* | (2006.01) |
| *F28F 27/00* | (2006.01) |
| *F01P 5/04* | (2006.01) |
| *F01P 7/02* | (2006.01) |
| *F01P 5/02* | (2006.01) |
| *F01P 7/04* | (2006.01) |
| *B60H 1/32* | (2006.01) |
| *F28G 13/00* | (2006.01) |
| *F28G 15/00* | (2006.01) |
| *F28D 1/04* | (2006.01) |
| *F01P 11/12* | (2006.01) |
| *F01P 11/14* | (2006.01) |

(52) U.S. Cl.
CPC . *F28F 27/00* (2013.01); *F01P 5/04* (2013.01); *F01P 7/02* (2013.01); *F01P 5/02* (2013.01); *F01P 7/04* (2013.01); *F28F 19/01* (2013.01); *B60H 1/32* (2013.01); *F28G 13/00* (2013.01); *F28G 15/003* (2013.01); *F28D 1/0443* (2013.01); *F01P 11/12* (2013.01); *F01P 11/14* (2013.01)

(58) Field of Classification Search
None
See application file for complete search history.

(56) References Cited

U.S. PATENT DOCUMENTS

| | | | |
|---|---|---|---|
| 4,757,858 A | 7/1988 | Miller et al. | |
| 5,944,603 A | 8/1999 | Guinn et al. | |
| 6,321,830 B1 * | 11/2001 | Steinmann | 165/41 |
| 6,354,096 B1 | 3/2002 | Siler et al. | |
| 7,401,672 B2 | 7/2008 | Kurtz, Jr. et al. | |
| 7,497,250 B2 | 3/2009 | Coy et al. | |
| 2005/0183417 A1 | 8/2005 | Nakagawa | |
| 2008/0108032 A1 | 5/2008 | Tuhy et al. | |

FOREIGN PATENT DOCUMENTS

DE 2008022887 A1 11/2009

\* cited by examiner

*Primary Examiner* — J. Allen Shriver, II
*Assistant Examiner* — Hilary L Johns (57) ABSTRACT

A debris passage for a cooling box of a work vehicle. Airflow is provided into the cooling box from the exterior environment. A plurality of heat exchangers transfer heat into the airflow. The debris passage is defined between opposing heat exchangers to permit debris to pass from the airflow to the exterior of the cooling box. In one embodiment, the debris passage is underneath an air mover and is substantially vertical.

9 Claims, 7 Drawing Sheets

FIG. 7

DEBRIS PASSAGEWAY FOR WORK VEHICLE COOLING PACKAGE

CROSS REFERENCE TO RELATED APPLICATIONS

This application claims priority to U.S. Provisional Application No. 61/471,025 filed Apr. 1, 2011, entitled "Debris Passageway for Work Vehicle Cooling Package" and is also related to U.S. application Ser. No. 13/437,056 entitled "Pusher Airflow for Work Vehicle Cooling System", U.S. application Ser. No. 13/437,179 entitled "Cooling Package Assembly for Work Vehicle", U.S. application Ser. No. 13/437,123 entitled "Controller for Work Vehicle Cooling Package", U.S. application Ser. No. 13/437,253 entitled "Air Mover Reversing For Work Vehicle Cooling Package", U.S. application Ser. No. 13/437,097 entitled "Control Method for Primary and Supplemental Cooling Systems for a Work Vehicle", and U.S. application Ser. No. 13/437,149 entitled "Method for Determining When Cooling System is Restricted", which have been filed concurrently with the present application.

BACKGROUND OF THE INVENTION

1. Technical Field

This invention relates to drawing in ambient air into agricultural machines such as combine harvesters and windrowers for cooling and other purposes.

2. Background

Current harvesting vehicles have issues with their cooling systems/packages. Most bring in high volumes of air into the cooling packages from the sides of the vehicles. Radiator screens are well known in the art. They are used to filter debris from an ambient air stream as it is drawn into the engine compartment. Due to cross-winds and the high volume of light, small trash from harvesting operations surrounding the harvesting equipment, the intake screens of these vehicles become plugged. Many agricultural vehicles use various devices to remove debris from the plugged radiator screens.

U.S. Pat. No. 5,944,603 discloses a sealing apparatus for a rotatable air inlet screen of an agricultural vehicle. The screen assembly 20 is positioned over the air inlet housing 22 and includes a rotatable member 24, screens 26 and 28, and cleaning assembly 30. The radiator fan 18, driven by the engine 14, draws air through radiator 16. The rotatable member 24 is unpowered and therefore does not push air into the air inlet housing or across the radiator 18. The radiator fan 18 induces airflow downward through screens 26, 28 and then the direction of airflow is changed in order for the airflow to pass through the radiator 16. The radiator fan 18 also induces rotation of rotatable member 24 and screen assembly 20 which results in a negative pressure difference.

Agricultural vehicles typically utilize stacked or multiple pass heat exchangers or cores such as A/C, engine radiators, charge air coolers, hydraulic coolers, condensers, etc. This reduces the cooling capacity of the downstream oil coolers and radiators as well as significantly increases the possibility of plugging intake screens.

However, a design which uses an air mover to push air from the top of the vehicle, where the air is cleaner compared to the sides of the vehicle, allows for the cleanest possible area for intake air. This also allows for a larger intake area and therefore a much lower intake airflow velocity. What is needed is a pusher air mover preferably located between the screen area and the heat exchangers that allows cool airflow to be pushed into the cooling package across the heat exchangers arranged in a configuration to permit single pass of fresh airflow across each heat exchanger to increase efficiency and reduce plugging during normal operation. The air mover may also be reversible at optimal times to generate airflow in the reverse direction to remove debris such as accumulated soil and small plant materials surrounding the screen area during a cleaning operation.

OVERVIEW OF THE INVENTION

The invention is directed to a debris passage for a cooling box of a work vehicle. Airflow is provided into the cooling box from the exterior environment. A plurality of heat exchangers transfer heat into the airflow. The debris passage is defined between opposing heat exchangers to permit debris to pass from the airflow to the exterior of the cooling box. In one embodiment, the debris passage is underneath an air mover and is substantially vertical.

In one embodiment, the invention is directed to a cooling system with airflow flowing into the cooling system from an exterior environment. The cooling system has a plurality of heat exchangers for transferring heat into the airflow. A debris passage is defined between at least a pair of the heat exchangers opposing one another for passing debris from the airflow to the exterior of the cooling system.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF EXAMPLE EMBODIMENTS

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "front", "rear", "left" and "right", are made as viewed from the rear of the harvester looking forwardly.

The present inventions may be used in any work vehicles such as, for example, harvester combines, windrowers or other types of agricultural, construction or forestry vehicles. An exemplary combine harvester 10 selected for illustration in FIG. 1 has a single rotary flow processing system 12 that extends generally parallel with the path of travel of the machine. However, as will be seen, the principles of the present invention are not limited to harvesters 10 with processing systems 12 designed for rotary flow, nor to axial flow harvesters having only a single such processing system. However, for the sake of simplicity in explaining the principles of the present invention, this specification will proceed utilizing a single rotary flow processing system 12 as the primary example.

Figure 1:
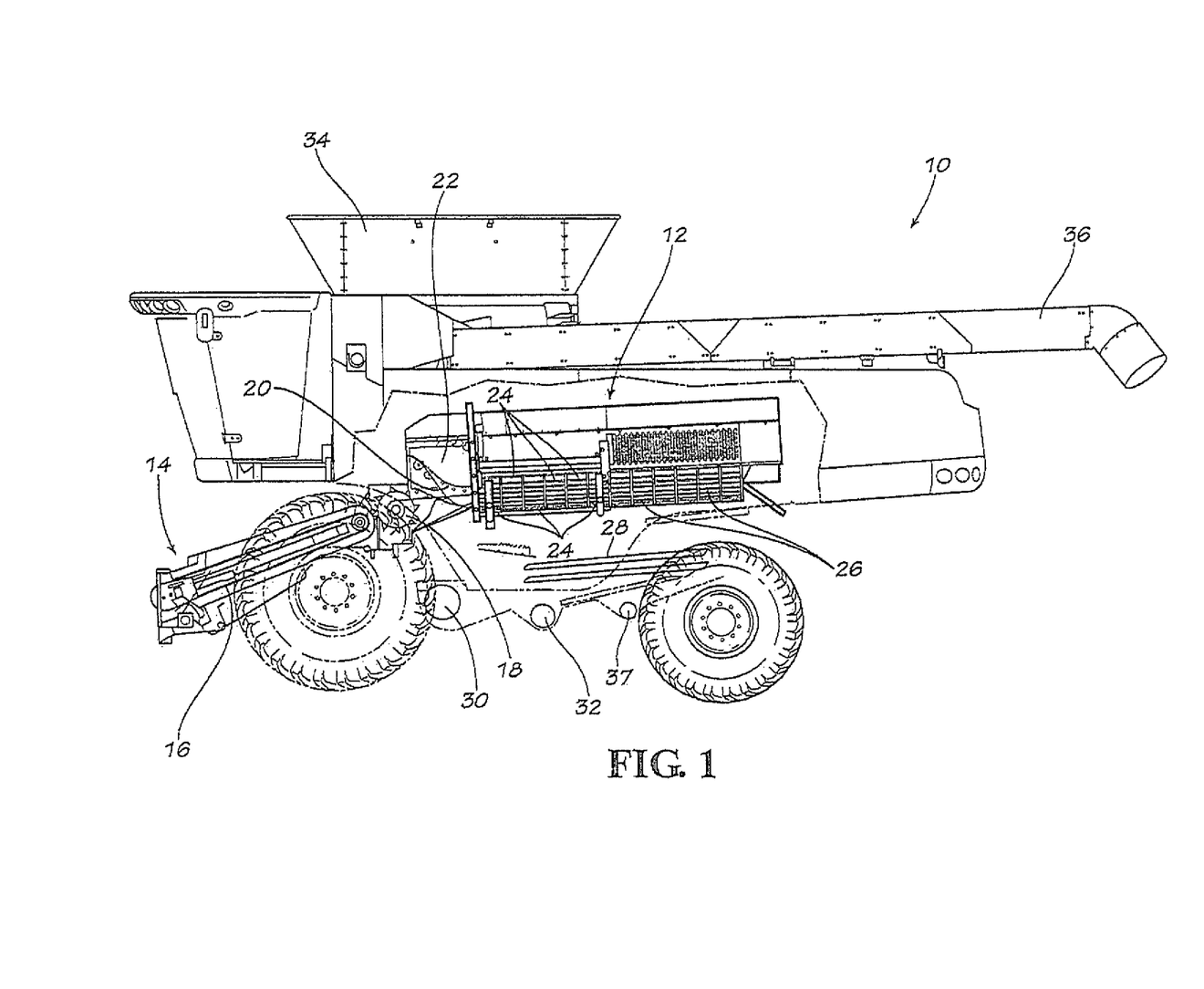
FIG. 1 is a schematic side elevation view of a combine harvester having a cooling system incorporating the principles of the present invention, portions of the harvester being broken away to reveal internal details of construction.

As well understood by those skilled in the art, in the illustrated embodiment combine harvester 10 includes a harvesting header (not shown) at the front of the machine that delivers collected crop materials to the front end of a feeder house 14. Such materials are moved upwardly and rearwardly within feeder house 14 by a conveyer 16 until reaching a beater 18 that rotates about a transverse axis. Beater 18 feeds the material upwardly and rearwardly to a rotary processing device, in this instance to a rotor 22 having an infeed auger 20 on the front end thereof. Auger 20, in turn, advances the materials axially into the processing system 12 for threshing and separating. In other types of systems, conveyor 16 may deliver the crop directly to a threshing cylinder.

Generally speaking, the crop materials entering processing system 12 move axially and helically therethrough during threshing and separating. During such travel the crop materials are threshed and separated by rotor 22 operating in cooperation with threshing concaves 24 and separator grate assemblies 26, with the grain escaping laterally through concaves 24 and grate assemblies 26 into cleaning mechanism 28. Bulkier stalk and leaf materials are retained by concaves 24 and grate assemblies 26 and are impelled out the rear of processing system 12 and ultimately out of the rear of the machine. A blower 30 forms part of the cleaning mechanism 28 and provides a stream of air throughout the cleaning region below processing system 12 and directed out the rear of the machine so as to carry lighter chaff particles away from the grain as it migrates downwardly toward the bottom of the machine to a clean grain auger 32. Auger 32 delivers the clean grain to an elevator (not shown) that elevates the grain to a storage bin 34 on top of the machine, from which it is ultimately unloaded via an unloading spout 36. A returns auger 37 at the bottom of the cleaning region is operable in cooperation with other mechanism (not shown) to reintroduce partially threshed crop materials into the front of processing system 12 for an additional pass through the system.

The combine 10 includes a framework around the processing system 12 that preferably includes a front bulkhead and a center bulkhead where the concaves 24 are supported between the front and center bulkheads. The grates 26 are preferably supported between the center bulkhead and a rear bulkhead. As shown in FIG. 1, both the concaves 24 and grate assemblies 26 together concentrically receive the rotor 22 to serve as part of processing system 12.

Figure 2:
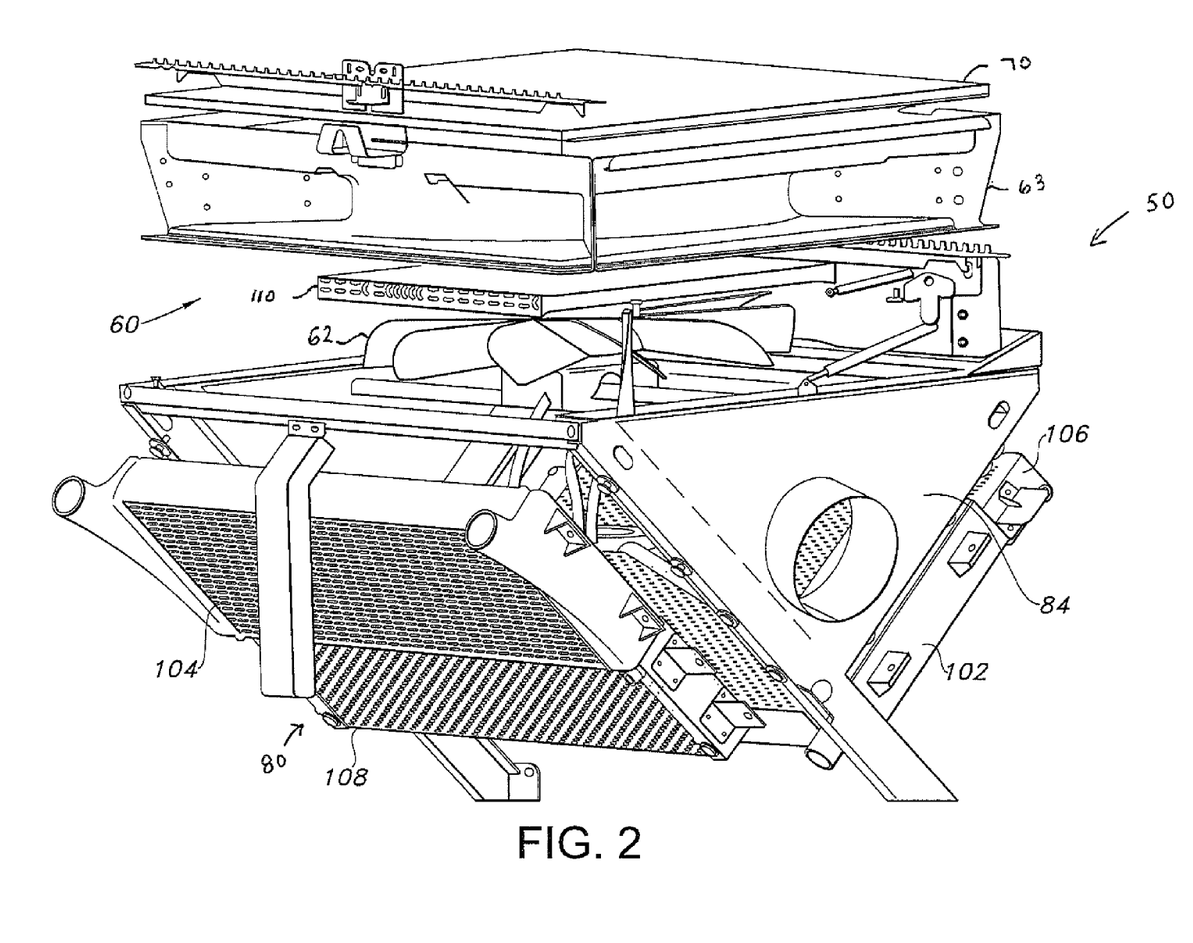
FIG. 2 is an exploded isometric view of an embodiment of the cooling system of the harvester of FIG. 1.
Figure 5:
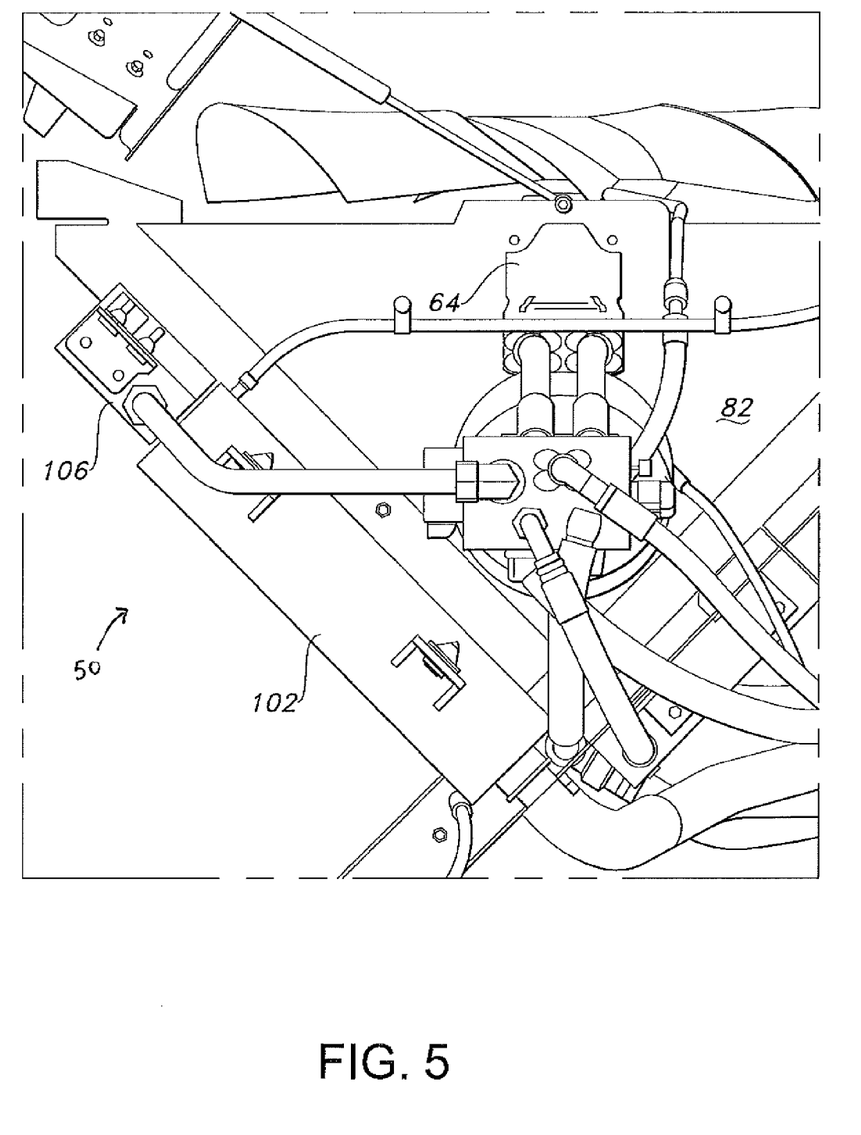
FIG. 5 is an enlarged end view of a portion of the cooling system of FIG. 2.

Turning now to FIG. 2, the combine 10 includes a cooling system 50 of the present invention. In one or more embodiments of the present invention, the cooling system 50 includes one or more air movers 60 such as a shrouded rotary fan having one or more fan blades 62 surrounded by shroud 63. However, the present invention contemplates other means of generating airflow or moving air from the exterior environment surrounding the combine 10 to the cooling system 50 and to the interior of the combine 10 such as the engine compartment. The air mover 60 is driven independently from the engine of the combine 10. Preferably, the air mover 60 is driven by a hydraulic motor 64 (FIG. 5). In some embodiments, the air mover 60 is a fan having a substantially vertical axis of rotation and a substantially horizontal intake face. In some embodiments, the axis of rotation may be off vertical by about 10 to 20 degrees. Also, the intake may be off horizontal by about 10 to 20 degrees.

Control of the hydraulic motor 64 of the air mover 60 is provided by a proportional hydraulic control valve 66 to permit variable speed and an on/off hydraulic control valve 68 for direction control. When the on/off hydraulic control valve 68 is in the "off" position, the air mover 60 operates in the forward direction and when the on/off hydraulic control valve 68 is in the "on" position, the air mover 60 operates in the reverse direction. Both hydraulic control values 66, 68 are controlled using temperature data from heat exchangers/coolers 102, 104, 106, 108 of the cooling system as described in greater detail below.

A debris screen 70 may be used overtop of the air mover 60. In such case, a cleaning system may be used to remove debris collected on the screen. However, in the cooling system 50 of the present invention defined in greater detail below, it is preferable to have the air mover 60 remain free of any such cleaning system.

The cooling system 50 may also comprise a cooling box 80 at least partially defined by a plurality of heat exchangers. The cooling box 80 may sometimes be referred to as an air box. One or more heat exchangers 102, 104, 106, 108 are used to define the cooling box 80. Preferably, one or more air movers 60 provide single pass airflow though the cooling box 80 in the sense that the air passes through the cooling box 80 once. Upstream faces 92, 94, 96, 98 of the heat exchangers 102, 104, 106, 108 cooperate with one another to at least partially define a substantially closed interior of the cooling box 80. The cooling box 80 may also include opposing end or side walls such as end walls 82, 84. Opposing heat exchangers 102, 104, 106, 108 are arranged or angled in the airflow from the air mover 60 relative to one another to define a v-shape. However, in some embodiments, stacked heat exchangers may be utilized.

In one or more embodiments, the air mover 60 is operative to push ambient air downward through the cooling box 80 from overhead of the combine 10 and to push airflow across the upstream faces 92, 94, 96, 98 of heat exchangers 102, 104, 106, 108. Because of the pushed airflow static pressure inside the cooling box is greater than the static pressure outside the cooling box 80. One or more of the heat exchangers 102, 104, 106, 108 are positioned in the airflow after an intake face of the air mover 60 and before the engine 120. Preferably, the air mover 60 is positioned adjacent to and above the cooling box 80 and the heat exchangers 102, 104, 106, 108 are angled in the airflow toward one another. The upstream faces 92, 94, 96, 98 of the heat exchangers 102, 104, 106, 108 converge in the airflow as the distance from the air mover 60 increases. Preferably, opposing proximal ends of the heat exchangers 102, 104, 106, 108 in the front of the airflow or closer to the air mover 60 are spaced further apart from one another compared to the spacing between opposing distal ends of the heat exchangers 102, 104, 106, 108 further along in the airflow. If the air mover 60 is a rotating fan, then the upstream faces 92, 94, 96, 98 of the heat exchangers 102, 104, 106, 108 are preferably angled relative to an axis of rotation of the air mover 60.

In one or more embodiments, heat exchanger 102 is a radiator coupled to an engine and a water pump (not shown) of the combine 12 by a circulation path for controlling the engine's operating temperature with coolant such as anti-freeze. The coolant picks up heat from the engine 120. A thermostat (not shown) responds to the temperature of the coolant and opens to allow hot coolant to travel to the heat exchanger 102.

In one or more embodiments, heat exchanger 104 is a charge air cooler (CAC) used to cool engine air after it has passed though a turbocharger but before it is routed into the intake manifold of the engine. As is known in the art, air comes in through an air cleaner into the turbocharger where it gains heat and then exits the turbocharger to the charge air cooler 104 and then goes to the intake manifold of the engine. It is desirable to mange the temperature rise through the turbocharger because when pressurized, the air is heating up. A temperature difference for the charge air cooler 104 of about 25 C above ambient temperature is preferable. Ambient temperature may be taken from the exterior of the combine 10 or from the temperature of the air in or at the exit of the air filter. Air into the air filter comes through cooling box 80.

In one or more embodiments, heat exchanger 106 is a hydraulic fan heat exchanger used to transfer heat from hydraulic fluid from the hydraulic motor 64 driving the air mover 60. Also, heat exchanger 108 may be an oil cooler for other hydraulically driven systems typically found on a work vehicle such as combine 10 or a windrower.

In another embodiment, one of the heat exchangers 102, 104, 106, 108 defining the cooling box 80 may be for a hydraulic system independent of the combine 10 itself that may be used for an implement towed by the work vehicle. Also, one of the heat exchangers 102, 104, 106, 108 may be for a hydraulic power take off.

Figure 4:
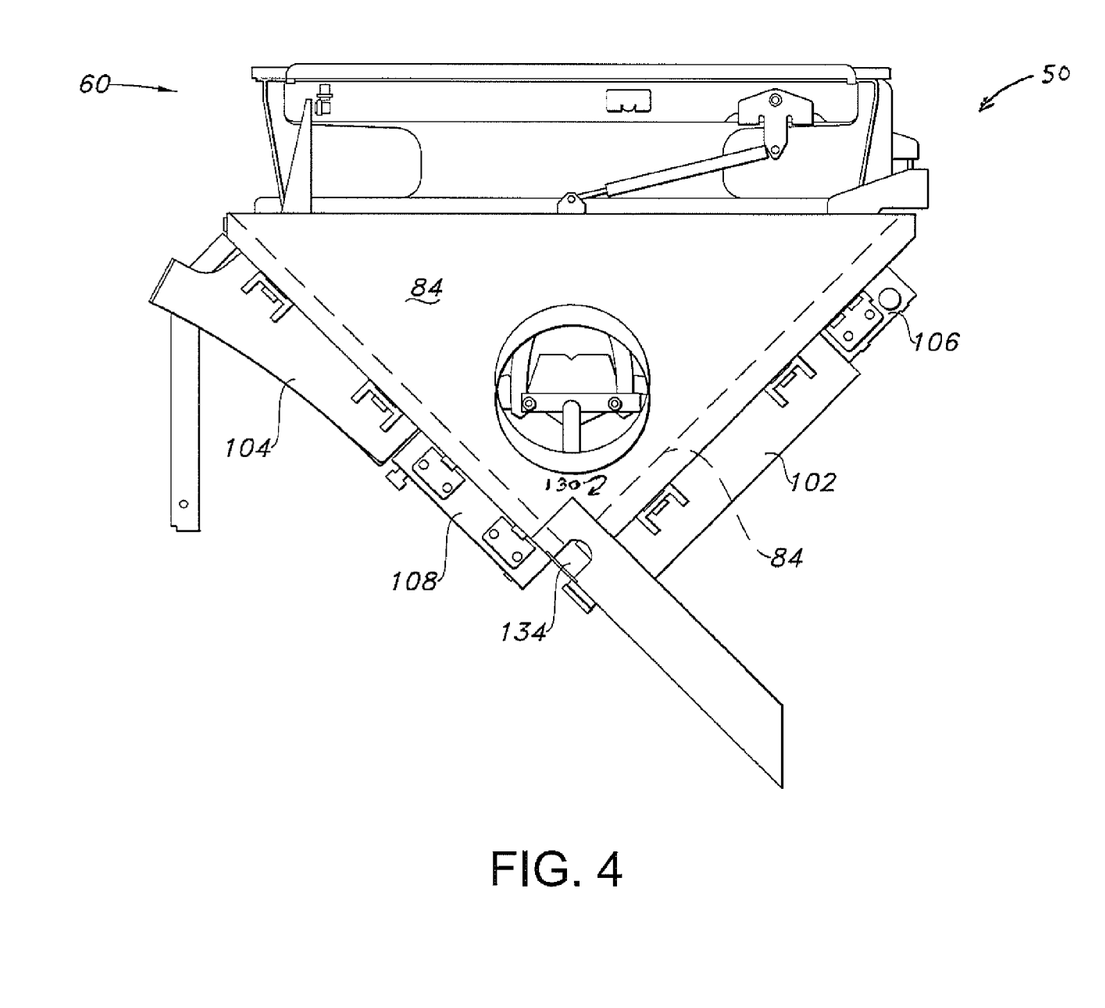
FIG. 4 is an end view of a portion of the cooling system of FIG. 2.

As perhaps best seen in FIG. 4, the heat exchangers 102, 104, 106, 108 are preferably arranged in a v-shaped manner and relative to one another as shown herein which depicts the easiest and most cost effective way to transfer heat with the heat exchangers 102, 104, 106, 108 and takes into account the distribution of airflow from the air mover 60. However, the shape of the system 50, the cooling box 80, or the location of each of the heat exchangers 102, 104, 106, 108 relative to one another, may be different depending on the particular heat exchangers selected because factors such as the depth of the core or how fine the fins easily affects the balance of heat rejection with the airflow. Preferably, the airflow is balanced or parallel out each side of the v-shaped cooling box 80 and a single pass of fresh airflow is pushed across each the upstream faces 92, 94, 96, 98 of the heat exchangers 102, 104, 106, 108 defining the inner confines of the cooling box 80. A portion of the fresh airflow brought into the cooling box 80 passes once through one of the heat exchangers 102, 104, 106, 108 and each heat exchanger has its own portion of the airflow from the air mover 60. In other words, each heat exchanger 102, 104, 106, 108 defining at least a portion of the cooling box 80 receives fresh airflow from the air mover 60 and no portion of the airflow is recirculated through another heat exchanger. Also, a heat exchanger may be referred to as single pass because its fluid or coolant passes through only once.

However, in some cases an external heat exchanger 110 (FIG. 2), such as a condenser for the AC of the cab of the work vehicle, may be placed outside of the cooling box 80 and in front of the air mover 60. In such case, because the heat exchanger 110 is outside the cooling box 80, the airflow from within the cooling box 80 and across each of the heat exchangers 102, 104, 106, 108 defining a portion of the cooling box 80 may still be referred to as single pass airflow. Heating of the airflow from the heat exchanger 110 placed in front of the air mover 60 has a nominal affect on the temperature of the airflow provided to the cooling box 80 by the air mover 60 and therefore the airflow is still referred to as fresh air.

Figure 3:
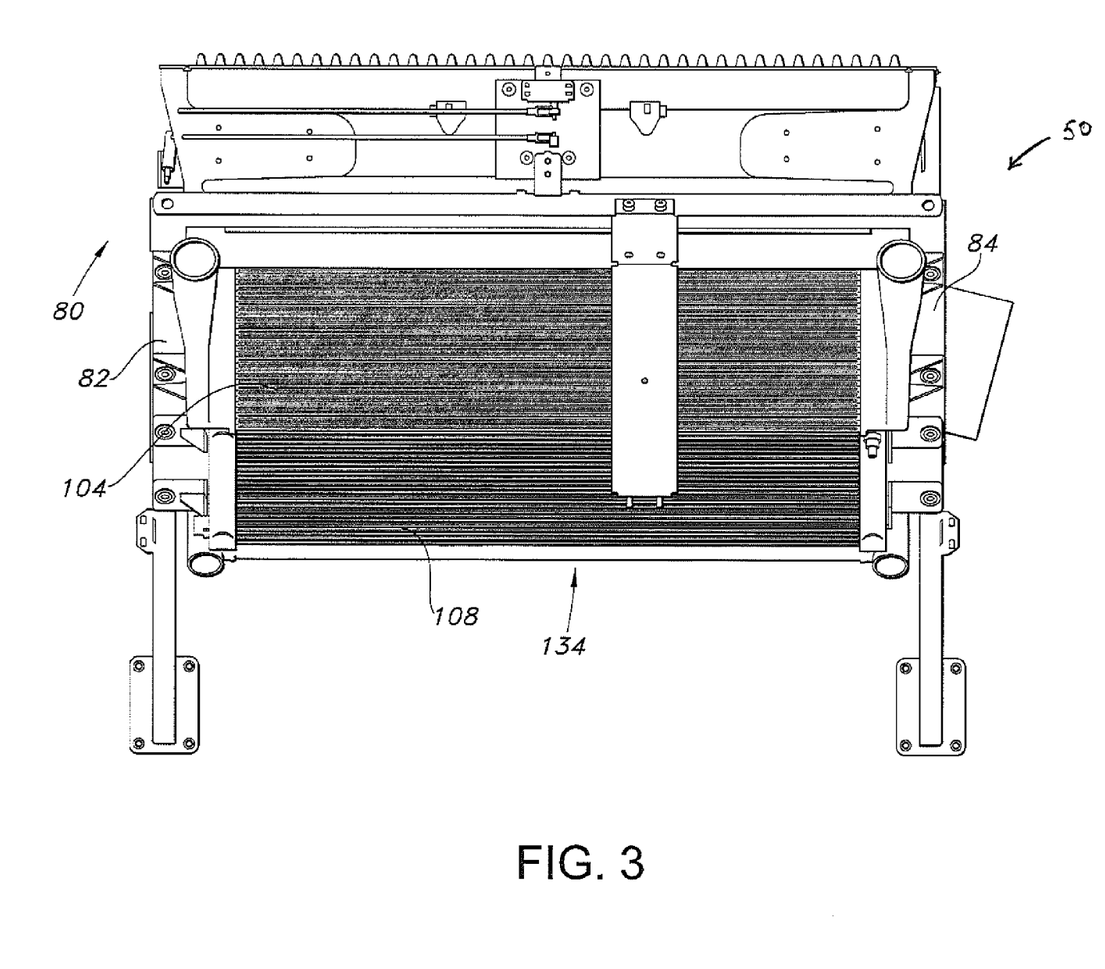
FIG. 3 is a side elevation view of a portion of the cooling system of FIG. 2.

As perhaps best seen in FIG. 4, the cooling system 50 may also include a debris passage 130 for passing debris that enters the cooling box 80 from the exterior environment along with the airflow generated by the air mover 60. The debris passage 130 is preferably defined between at least a pair of opposing heat exchangers 102, 104, 106, 108. The debris passage 130 permits debris to pass from an upper portion of the cooling system 50, down between opposing heat exchangers, and to the exterior of the cooling system 50 though a debris outlet 134 defined between opposing ends of the heat exchangers 102, 104, 106, 108. In one embodiment, the narrowest spacing between the lowermost or converging distal ends of opposing heat exchangers defines an elongated debris outlet 134 that substantially corresponds with the horizontal width of the heat exchangers 102, 104, 106, 108 and thus the cooling box 80 as best seen in FIG. 3.

Preferably the debris passage 130 within the cooling box 80 is positioned underneath and substantially vertically aligned with the air mover 60 and also substantially vertically aligned with the debris outlet 134 underneath, so that the most can be made out of gravity assisting in removing the debris from the cooling box 80. Because the air mover 60 is reversible, it provides airflow in one direction when pushing air into the cooling box 80 and provides airflow in a second direction when operated in the reverse direction to draw air out of the cooling box 80. When the air mover 60 is operated in a first direction to push airflow into the cooling box 80, a portion of the airflow escapes through the debris outlet 134 at a greater velocity compared to airflow passing through the heat exchangers 102, 104, 106, 108. This higher velocity airflow can be used to facilitate removal or force debris from the cooling box 80. When the air mover 60 is operated in the reverse or second direction, the reversed airflow agitates the unwanted debris that is being held or that may have become stuck within the cooling box 80. Then, when the air mover 60 is returned to operating in the first direction, the agitated debris then may pass through the debris outlet 134.

In addition to the cooling system 50 itself described herein, the invention includes methods for operating one or more air movers 60 to minimize power consumption by having the speed of the air mover 60 dependent on cooling requirements. For example, reversing cycles of the air mover 60 may be regulated by allowing a minimum and maximum time between reverse cycles. This prevents perpetual reversing conditions, but also forces reverse cycles at regular intervals. The air mover 60 may also be reversed when the engine speed is lowered below a minimum threshold, suggesting a shutdown condition may occur and removing any debris where it may otherwise reside during idle periods thus allowing adhesion.

In one or more embodiments, a control method senses multiple signals and when combined, will control the cooling of the air mover 60 to minimize power consumption while allowing data from the heat exchangers 102, 104, 106, 108 to regulate the speed of the air mover 60 as required. During air mover 60 operations, each system with a heat exchanger is evaluated for desired air mover speed to maintain temperatures within defined bounds. For example, temperature data for the engine, hydraulic oil, and engine intake manifold are measured. The temperature data results in an associated required fan speed for cooling each heat exchanger 102, 104, 106. The temperature data is reconciled by using the highest air mover speed (to address the most critical temperature data) as the overall resulting/set point speed. In other words, the highest desired air mover speed as a result of the temperatures of each of the heat exchanger systems becomes the set point speed for the air mover 60.

At about the same time, the air intake temperature is measured and a suggested speed for the air mover 60 is determined. Empirically, the air mover 60 should be running at the suggested speed to meet equilibrium cooling conditions. The suggested speed is derived using a mathematical model using suggested speed determined as function of the air intake temperature. If the overall set point speed exceeds the suggested air mover speed, a reversing condition exits suggesting a restricted screen 70 or debris within the cooling box 80 preventing proper cooling. The determined set point speed may be automatically compared to the suggested speed of the air mover 60 to initiate reversing of the air mover 60 as explained below.

Because the air mover 60 is open loop controlled, the cooling system 50 must convert the requested speed to a corresponding Pulse Width Modulation (PWM) duty cycle for control of the proportional hydraulic valve 66. An air mover speed sensor may be used in some embodiments, but is not required because there is a relationship between air mover speed and PWM. The requested air mover speed is converted to a value setting or percentage of maximum voltage. The hydraulics are organized such that a higher duty cycle results in a lower air mover speed. If there is no electrical power to the air mover 60, the air mover 60 will operate at maximum RPM in the forward direction because the hydraulics will still operate to keep the system cooled as a failsafe to avoid overheating.

One of the features of the present inventions is the multiple conditions to control the reversing of air flow. One or more air movers 60 may be reversed upon the occurrence of many conditions such as when the set point speed exceeds suggested air mover speed from the ambient temperatures, time exceeds the maximum allowed between reverse cycles, coolant temperatures exceeds critical temperature, hydraulic temperature exceeds critical temperature, charge air delta temperature rise exceeds critical temperature, user requests a reverse cycle, and reverse cycle with equipment shutdown. In some instances, as described below, the frequency at which the airflow reverses may be restricted. Once conditions return to normal, the reversing of the airflow can be deactivated.

1. Determined Set Point Speed Exceeds Suggested Air Mover Speed from the Ambient Temperatures Once the set point air mover speed is determined, the reversing conditions are evaluated. Automatic reversing air mover conditions exist when the overall resulting speed of the air mover 60 exceeds the suggested speed. This allows for debris removal using air mover reversing at various ambient temperature conditions. Without the ambient considerations, reversing may only occur at extreme temperatures using critical reversing conditions described below (critical engine coolant, critical hydraulic oil temperature, and critical charge air temperature). By conducting an earlier reverse cycle, the air mover consumes less power by running at slower required speeds and any lodged debris on the screen 70 or within the cooling box 80 may be more easily removed. As any temperature used to determine the set point increases, the air mover speed increases to compensate, creating further vacuum and lodging debris into the cooler screen 70 or in the cooling box 80. It is desirable to dislodge the debris before it gets deeply embedded into the screen 70 or cooling box 80 by reversing the air mover 60.

2. Maximum Allowed Time is Exceeded Between Reverse Cycles

Conditions may exist that would normally prevent the air mover 60 from reversing. To prevent debris buildup in those conditions, a timed reverse may be implemented. The maximum allowed time between reverse conditions is defined by a stored parameter in the controller such as about 900 seconds. In some embodiments, a minimum time period could elapse before consecutive occurrences of reversing the air mover 60 to prevent the air mover being in a constant reverse pattern. This value is also defined by a stored parameter such as about 120 seconds.

3. Coolant Temperature Exceeds Critical Temperature

If the engine coolant temperature continues to climb and exceeds the critical temperature set at about 101 C, a reverse request can be sent. Desirably, reverse does not occur until the minimum allowed reversed time has elapsed.

4. Hydraulic Temperature Exceeds Critical Temperature

In one embodiment, if the hydraulic oil cooler temperature exceeds about 85 C, a reverse request is sent. Desirably, reverse of the air mover 60 does not occur until the minimum allowed reversed time has elapsed.

5. Charge Air Temperature Rise Exceeds Critical Temperature

If the charge air cooler temperature rise (Intake manifold temperature-Intake air temperature (preferably before the charge air cooler)) exceeds about 25 C, a reverse request may be sent. Desirably, reverse of the air mover 60 does not occur until the minimum allowed reversed time has elapsed.

6. User Requested Reverse Cycle

The operator interface of the combine 10 has a button that may be pressed to force an air mover reverse condition.

7. Reverse on Shutdown

Because the screen 70 for the cooling box 80 is preferably substantially horizontal on the top of the combine 10, it is desirable to ensure that all debris is removed when the combine 10 is parked. A reverse request may be initiated when the engine RPM was above 1800 RPM and then drops below 1500 RPM suggesting the combine 10 is being parked. Desirably, reverse of the air mover 60 does not occur until the minimum allowed reversed time has elapsed.

Reversing Cycle

When a reverse cycle occurs, in one or more embodiments of the present invention, the system may preferably execute the following sequence (any time or range of time may be a preset and stored configurable value):

Slow the air mover 60 to minimum speed (approximately 70% duty cycle);

Wait approximately 0.1 to 3 seconds for slowing of the air mover 60;

Activate the on/off hydraulic control valve 68;

Speed the air mover 60 (in reverse) up to about 1400 RPM, this is a configurable preset value stored in controller memory (fan actually runs 1800 RPM when using normal control algorithm, less power is required when operating in reverse);

Hold for approximately 0.1 to 3 seconds, this is a configurable preset value;

Slow the air mover 60 to minimum speed;

Wait about 0.1 to 3 seconds for slowing, this is a configurable preset value;

De-activate the on/off hydraulic control valve 68;

Resume normal control algorithm.

Figure 6:
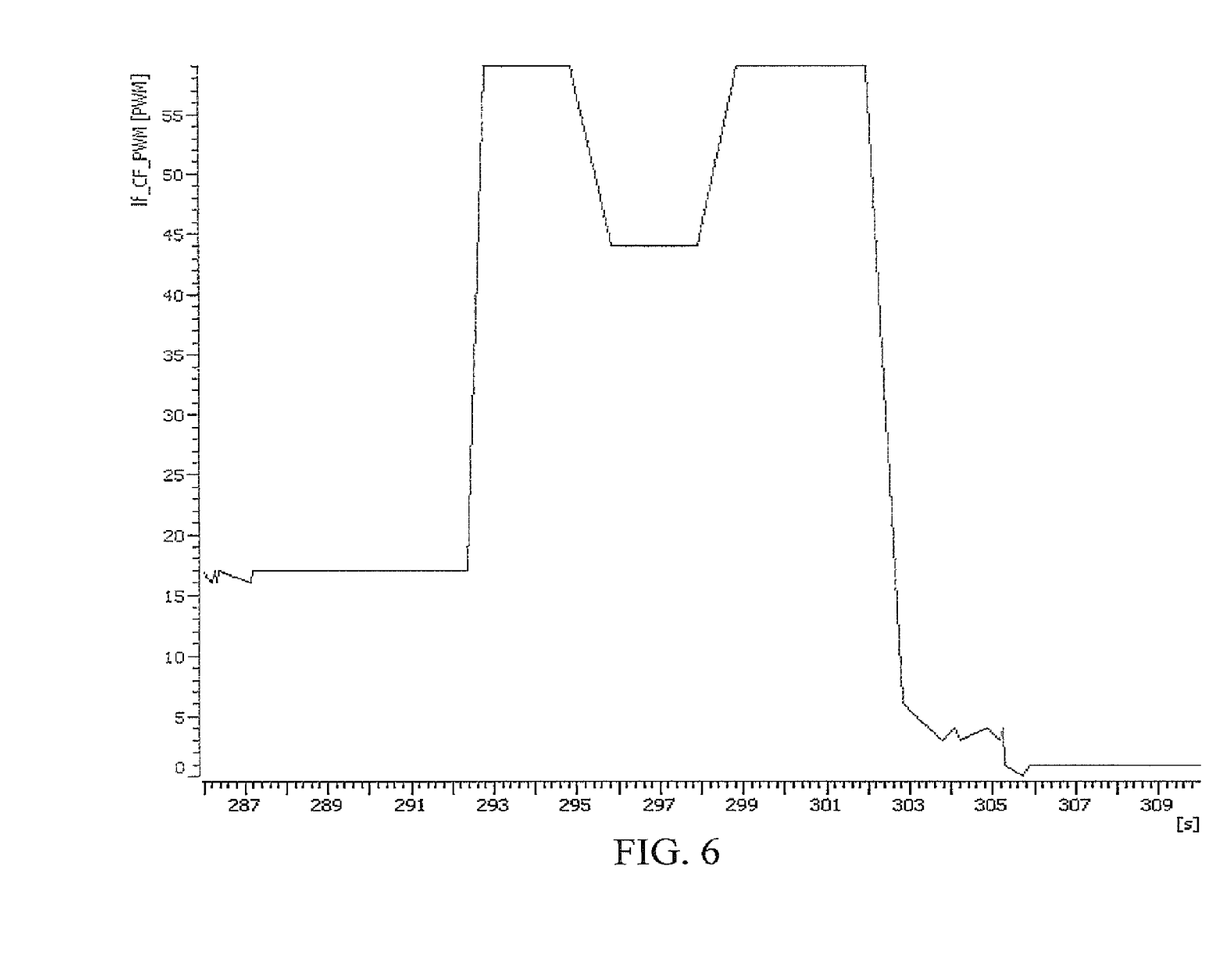
FIG. 6 is a graph of a typical reverse cycle of the cooling system with the PWM duty cycle on the Y-axis and time on the X-axis.

Speed of the air mover 60 desirably is changed at a constant rate. The graph in FIG. 6 shows a typical reverse cycle. The PWM duty cycle is on the Y-axis and time on the X-axis. Higher PWM values results in slower air mover speed.

Tuning

The air mover control algorithm allows flexibility for tuning. There are several equations in the system to set requested speeds, suggested speeds and duty cycles. The relationship between air mover speed and temperature is not linear but within the bounds of where the systems of the combine 10 operate it may be preferable to approximate it as a linear system.

Duty Cycle

Figure 7:
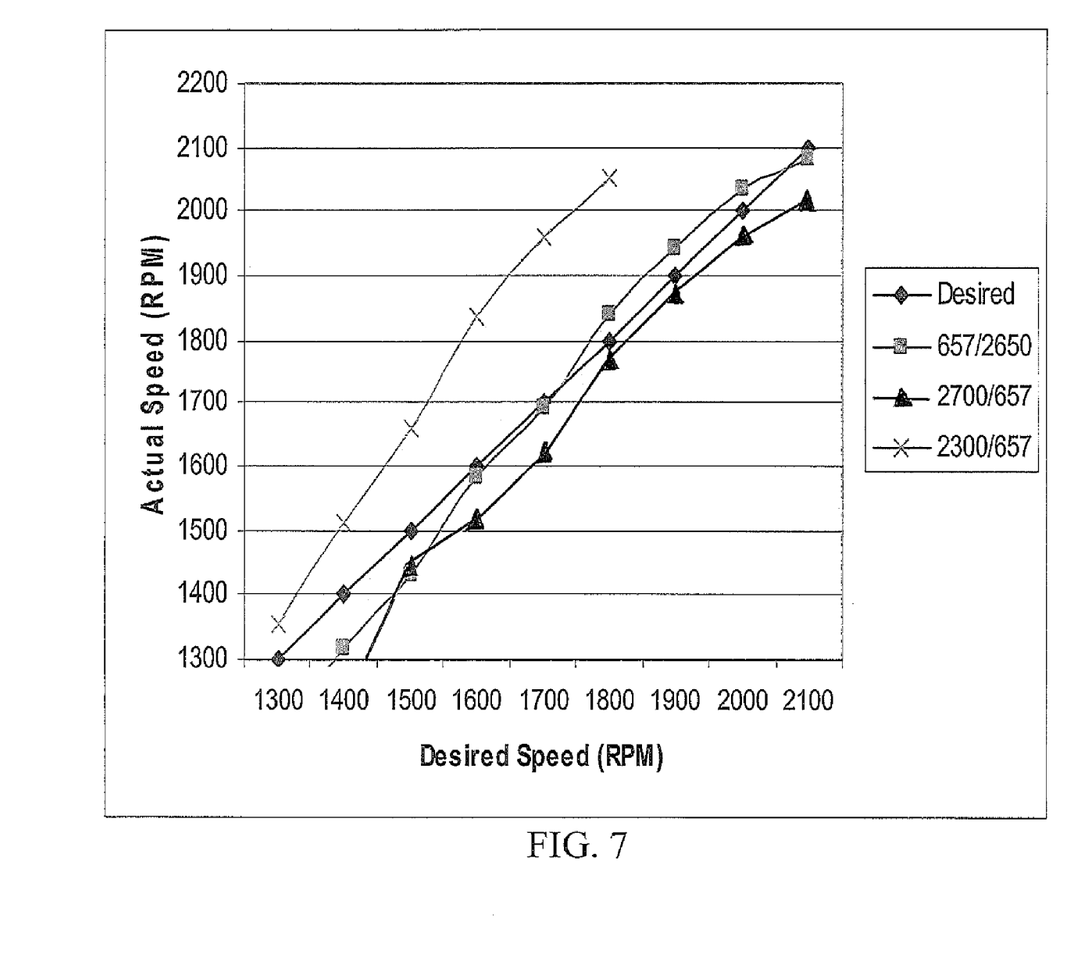
FIG. 7 is a graph of the actual speed versus the desired speed when tuning the control system of the cooling system of the harvester.

Because the control system uses air mover speed for the control algorithm and air mover speed may not be measured, a relationship between air mover speed and value setting must exist. This is achieved by a tuning process. The control system has two fixed PWM values (70% and 0%) corresponding to minimum and maximum speed, respectively. The actual air mover speed is recorded for those values. Initial speed values for 0% and 70% were tried based upon manual air mover speed tests and the result revealed the air mover did not track to actual speed. Values of 2700 and 657 worked closer, but the values of 2650 and 657 appeared to provide the best approximation. FIG. 7 reveals the non-linearity in the PWM versus Speed settings. The 2650/657 actually works well because when more cooling capacity is required, the air mover is running slightly faster than the theoretical speed.

Intake Air Temperature

Intake air temperature is a good approximation to ambient air temperature. The intake air temperature sensor may be installed in proximity of the air filter/cleaner or is typically installed approximately ⅓ of the distance between the air cleaner and the turbocharger inlet, in a metal tube. To the extent a sensor is referenced throughout this document, it is any sensor that converts temperature into a measurable electrical signal. Test results (using an independent temperature sensor), reveal the true intake air temperature is approximately 5-6 C greater than the ambient temperature once the system reaches operating conditions. This is understandable considering the intake air source comes from the interior of cooling package 50.

The combine intake air sensor may be about 6 C higher than the intake air temperature once hot conditions occurred because the sensor does not only measure intake air temperature. It is biased with conductive temperatures belonging to its surroundings. A bias may be imposed on the air intake sensor to compensate for any thermal conductivity or solar gain the sensor may pickup. Because this appears to be a fixed bias at all times, the air mover control algorithm preferably subtracts about 6 C (i.e. an offset temperature) from the actual intake air temp sensor and establishes this as the intake air temperature. In cold or startup conditions, the combine intake air temperature will reveal this negative bias. However, it takes a very short period to mitigate this.

Speeds and Times

There are various air mover speeds and times that are adjustable with one or more software modules. For example, when the engine is at low idle (high idle is about 1500 RPM or more, but the vehicle is not moving), the air mover speed can be dropped to conserve power. Preferably, air mover speed is controlled as a function of time so that speed changes are smoothed over time and not as a step change to control noise. The resulting values are used to reduce noise emissions for better operator and bystander noise comfort:

At approximately 975 RPM—Minimum air mover speed at low idle

1300—Minimum air mover speed at high idle (>1500 RPM)

1400—reverse air mover speed (air mover true speed is approximately 1800 owing to reduce power requirements in reverse)

657—Minimum air mover speed at 70% (for PWM tuning)

2650—Maximum air mover speed at 0% (for PWM tuning)

3 seconds—reverse time 1 second—Slowdown time 1 second—valve delay

EXAMPLES

Engine Radiator Restricted/Blocked with Debris

As power requirements increased, the charge air cooler (CAC) temperature initially controls the cooling air mover requirements beginning at approximately 165 seconds. CAC continues to control the air mover until about 300 seconds, when the coolant temperature takes control. As the cooling requirements increase due to the blocked radiator, the speed of the air mover 60 responds accordingly.

The first reverse cycle occurs at about 400 seconds. This cycle occurs because the requested air mover speed (from the engine cooler), exceeds the suggested air mover speed based on the intake air temperature. Further reverse cycles occur at the maximum allowed frequency of 120 seconds. All would be initiated with the requested speed exceeding the suggested air mover speed given the ambient conditions. If the temperature of the engine 120 exceeds the critical reverse temperature of 101 C, the air mover may be reversed just prior to reaching this critical temperature, preventing further reverses until the minimum allowed time has elapsed. The engine loading was reduced at 1156 seconds, reducing the cooling requirements.

Charge Air Cooler (CAC) Restricted/Blocked with Debris

Restricting or blocking the charge air cooler with debris results in rapid air mover speed increase, resulting is the charge air driving the air mover speed. The reverse cycle is initiated by an increase in the coolant temperature above the desired ambient temperature speed. Reversing occurs at the maximum allowed time of 120 seconds to mitigate the increased charge air temperature delta. The maximum allowed CAC delta temp of >25 C causes the reverse cycles. The intake air temperature continues to increase over time until it reaches a plateau of approximately 48 C. With the increase in intake air temperature, the intake manifold temperature also increases. By the $6^{th}$ reverse cycle (approx 700 seconds), the charge air delta temperature is such that the air mover may begin to run slightly slower (approximately 100 rpm) due to a lower CAC delta temperature. The next reverse cycle is triggered by the >25 C CAC delta temperature, and after that, the intake air temperature increases enough that a subsequent reverse cycle is not initiated.

Supplemental Cooling Synchronization

One or more embodiments of the present invention include a control method to operate a supplemental cooling system 50A for independent hydraulic systems such as a towed implement or hydraulic PTO. An air mover 60A of the optional supplemental air cooler system 50A may comprise one or more supplemental air movers 60A, such as a series of electric or hydraulic fans, and be synchronized with the primary cooling air mover 60 and their reversing ability combined. The second airflow may be used exclusively for systems independent of the combine 10 but may instead be used to cool hydraulics for a supplemental power source for the work vehicle such as an additional hydraulic pump for a combine header requiring supplemental cooling. The second airflow could also be used for the systems independent of the combine 10 in combination with the supplemental power sources of the work vehicle. Synchronizing the reversing of both air movers systems 60, 60A is preferable because if each system reversed independent of the other one air mover system when reversed would dislodge debris that would be drawn in by the other air mover system.

Staged air movers reduce power consumption to those times when only necessary. The method includes turning on one or more of the air movers 60A as the heat rejection load is required. The method may also include the step of comparing cooler output temperatures of the hydraulic oil cooler to oil reservoir temperatures and implement an air mover reversing operation to clear a supplemental cooling box screen 70A or clear the inner confines of the supple mental cooling box 80A from debris accumulation. The supplemental air mover 60A may be positioned at the left rear engine deck of the combine 10.

Temperatures are measured for the hydraulic oil reservoir of the combine 10 and at the output of the supplementary cooler 80A. Staging of the air movers 60A is controlled by absolute cooler outlet temperatures. For example if three air movers 60A are installed for cooling in a linear setup, a three stage implementation may be used where stage one would be the center air mover, stage two would be the two outside air movers, and stage three would be all air movers operational. The stages would increase as the outlet temperature increase.

Reversing of the air movers 60A is required to remove debris from the supplemental cooler. There may be several reversing criteria such as manual reverse, timed reverse, temperature reverse, synchronized reverse, and shutdown reverse. When reversing occurs, all presently operating air movers are stopped of forward motion and all air movers are reversed after a small delay. If possible, the air movers are started sequentially to minimize the startup currents associated with electric motors.

Manual reverse may be initiated by the operator. Timed reverse is based on a fixed period of time. Temperature reverse is when the supplementary cooler 80A does not cool the oil to within a fixed delta temperature when compared to the hydraulic oil reservoir. Synchronized reverse is when reversing occurs at the same time as the primary cooler 80. Shutdown reverse occurs after the optional system has ceased operating and the cooler has reduced the outlet temperature to within a fixed delta temperature of the reservoir.

One or more embodiments of the present invention include a method for determining when a cooling system 50 is restricted with debris by measuring the performance of heat exchangers individually. The method uses temperature sensors to measure the temperature at the inlet and at the outlet of the airflow on both sides a particular heat exchanger. An initial or baseline temperature difference is determined when the heat exchanger is substantially unrestricted. Preferably, the air mover is first reversed to allow the initial temperature difference to be determined immediately thereafter or at some later point in time. This initial temperature difference is representative of the heat exchangers performance when airflow through the heat exchanger is maximized for a given air mover speed or CFM of airflow. As airflow through the heat exchanger is restricted by debris, the difference in temperature between the inlet airflow and the outlet airflow will diminish. As time passes, debris buildup causes the temperature difference to drop. Once the temperature difference reaches a predetermined value less than the initial temperature difference a reverse cycle is signaled.

A method for removing debris based on the performance of an individual heat exchanger includes the step of providing airflow to cool the heat exchanger. The method includes the steps of determining a temperature of the airflow at an inlet to the heat exchanger and determining a temperature of the airflow at an outlet of the heat exchanger. Then, the method may include determining a temperature difference between the inlet and outlet temperatures of the heat exchanger. Preferably this temperature difference is determined after a period of time after an initializing reverse but while the heat exchanger is performing optimally. After determining that the temperature difference is decreasing over time; the method includes reversing direction of the airflow to remove debris from the heat exchanger.

The method may also include the step of performing an initializing reverse of the airflow prior to determining the temperature difference representative of when the airflow through the heat exchanger is maximized. The method may also include the step of waiting to reverse the airflow until the temperature difference reaches a predetermined value less than the temperature difference that had been determined when the airflow through the heat exchanger had been maximized. Preferably the temperatures and the temperatures are determined based on a specific CFM of airflow or when an air mover is operating at a specific speed.

The method for removing debris based on the performance of an individual heat exchanger may comprise the steps of providing airflow to cool the heat exchanger, determining a first temperature difference between an inlet and an outlet of the heat exchanger when airflow though the heat exchanger is substantially unrestricted, determining a subsequent temperature difference between the inlet and the outlet of the heat exchanger, determining the subsequent temperature difference is less than the first temperature difference by a predetermined amount; and in response to determining the subsequent temperature difference is less than the first temperature difference by the predetermined amount, reversing direction of the airflow to remove debris from the heat exchanger.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A cooling system for a vehicle comprising:
   an air mover operative to push ambient air downward from overhead of the vehicle for providing airflow into said cooling system from an exterior environment;
   a cooling box having an interior at least partially defined by upstream faces of a plurality of heat exchangers, with at least one of said plurality of heat exchangers on a first side of the cooling box and at least one of said plurality of heat exchangers on an opposing side of said cooling box, each of said plurality of heat exchangers providing cooling to a different component of the vehicle, wherein opposing heat exchangers are angled relative to one another with proximal ends of opposing heat exchangers spaced further apart than converging ends of said opposing exchangers such that said heat exchangers cooperate with one another to define a v-shape, the plurality of heat exchangers for transferring heat into said airflow; and a debris outlet forming a debris passage, the debris outlet between converging ends of the at least a pair of said heat exchangers opposing one another for passing debris from said airflow to the exterior of said cooling system.

2. The cooling system of claim 1 wherein said debris passage permits debris from said airflow to fall between said opposing heat exchangers to the exterior of said cooling system.

3. The cooling system of claim 1 wherein said debris passage is substantially vertical.

4. The cooling system of claim 1 wherein said debris passage is underneath said air mover providing said airflow.

5. The cooling system of claim 1 the air mover for providing said airflow when moving in a first direction, said air mover when reversed into a second direction moving debris within said cooling box, and debris passing from said cooling box when said air mover is again operated in said first direction.

6. The cooling system of claim 1 wherein debris falls though said cooling box and said debris outlet due to gravity.

7. The cooling system of claim 1 wherein gravity affects debris falling from said air mover through said debris passage within said cooling box and out said debris outlet.

8. The cooling system of claim 1 wherein said airflow has a greater velocity through said debris outlet compared to said airflow through said heat exchangers to facilitate passing debris from said cooling box.

9. The cooling system of claim 1, said cooling system otherwise free of a cleaning assembly for cleaning debris from said air mover.

* * * * *